No. 43,569.  
PATENTED JULY 19, 1864.  
M. H. CARD & T. TRIPP.  
CAR COUPLING.

Witnesses,  
Thos. Tripp  
Lemuel Rock

Inventors,  
M. H. Card  
Thomas Tripp  
by Coburn & Mann  
attorneys

UNITED STATES PATENT OFFICE.

M. H. CARD AND THOMAS TRIPP, OF CHICAGO, ILLINOIS.

IMPROVEMENT IN CAR-COUPLINGS.

Specification forming part of Letters Patent No. 43,569, dated July 19, 1864.

*To all whom it may concern:*

Be it known that we, M. H. CARD and THOMAS TRIPP, of Chicago, in the county of Cook and State of Illinois, have invented a new and useful Improvement in Automatic Car-Couplings; and we do hereby declare that the following is a full, clear, and exact description thereof, reference being had to the accompanying drawings and the letters and figures marked thereon, which form part of this specification.

Figure 1:
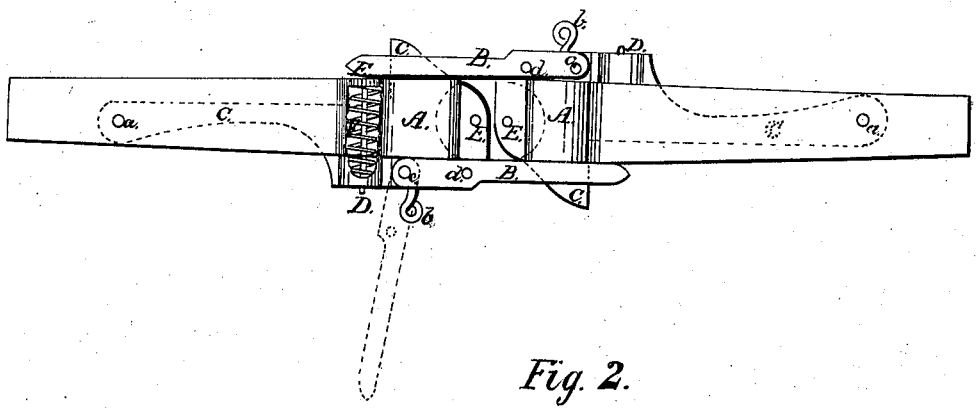
Figure 2:
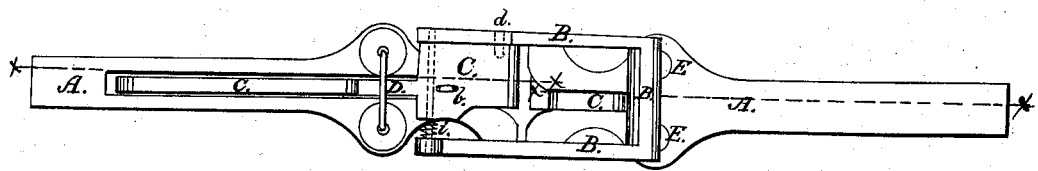
Figure 3:
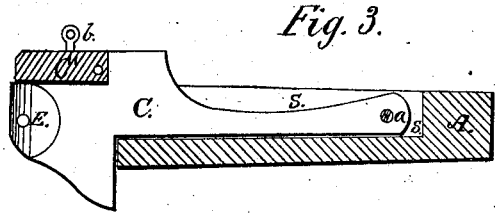

In said drawings, which are hereunto attached, Figure 1 represents a plan or top view of our invention. Fig. 2 is a side view of the same, and Fig. 3 is a sectional view thereof at the line $x$ in Fig. 2.

The nature of our invention consists in a novel device for coupling cars together, consisting of a draft-link rigidly attached to an adjustable hook, which is retained in position by the operation of a spring or springs suitably arranged, said device being used upon each of the draw-heads attached to a car, and arranged in such a manner that, when the cars are run together, by the yielding of said springs and the reciprocal action of the hook and draft-link upon one draw head, with the same devices upon the other, the said links pass over the corresponding hooks, when the spring adjusts and confines the links upon the hooks, and the cars are thus automatically coupled together.

Our invention further consists in so attaching the said draft-links to the hooks aforesaid upon each draw-head as to be adjustable, so as to be turned back out of the way to enable the cars to be coupled in the ordinary way by a link and a pin through each draw-head.

To enable those skilled in the art to understand and construct and use our invention, we will proceed to describe the same with particularity, reference being made to the aforesaid drawings.

A A represent the two draw-heads, which are attached to the adjacent ends of the cars to be coupled together in any suitable manner. Each of said draw-heads is provided with a longitudinal slot extending from the abutting ends thereof back to a sufficient distance to serve the purpose for which it is designed, which slot (marked $s$ in the drawings) opens upon one side of the draw-heads to allow the hook C to move laterally in said slot.

B B represent the two draft-links, one being attached to each of the hooks C by means of the pins $c$ $c$, or in any other suitable manner. These links are constructed substantially in the form of a clevis, the arms thereof being attached to the hooks C by means of the pins $c$ $c$, so that said links can be swung around, as shown by the red lines in Fig. 1.

$d$ $d$ represent short pins or projections attached to the links B, as shown, which rest in holes in C, so that said links are rigidly connected to the hooks, except the links be raised up until the pins $d$ are wholly withdrawn from the aforesaid holes, when the links may be swung around, as aforesaid. The arms of said links must be far enough apart to allow of such vertical play, being wider than that part of C to which it is attached by the length of said pin $d$, or wider, if so desired. The spring $i$ may be used, if thought best, to prevent the said link being thrown up accidentally, so as to detach the pin $d$ and allow the link to be turned back when in use. The only object of having said links adjustable is to enable this coupling to be used with the ordinary coupling, and when such adjustability is not desired the links and hooks may be manufactured of a single piece of metal.

C C represent the hooks hereinbefore mentioned, which are pivoted by a strong bolt at the rear end at $a$. The said hooks, turning upon said point $a$, are readily moved out from said slot $s$, thereby drawing in the point of said hooks within the recess in the ends of the draw-heads. It will be observed that the configuration of the ends of said hooks is such as will admit the ordinary coupling-link to be used by fastening the same with pins through the holes marked $e$ $e$. C′ in Fig. 3 is a section of that part of C to which the link is attached.

D D represent a strong band or clasp passing around the back of said hooks, as shown. Each end of said clasp, passing through the draw heads and through spiral springs F, arranged in cylindrical chambers constructed therein, is attached to the circular disks or plates E, which are of the same size as the said cylindrical chambers, and slide freely within the same. The said springs F rest at one end upon said disks E and at the other end against shoulders in said chamber, so that the action of the springs will, by pressing upon said disks, bring the hooks back to place after being sprung, as hereinafter described.

The links B may be of any desired width between the arms thereof, so as to enable cars of different heights to be coupled together by our improved mode, and at the same time have the draft come in a horizontal line, thus avoiding the objections incident to an oblique draft, which occurs whenever cars of different heights are coupled together in the ordinary way.

As the cars approach each other, the links B B being rigidly attached to the hooks C C, the front ends thereof strike against the curved or beveled ends of the draw-heads and slide out upon the curved exterior surface of the hooks, the effect of the reciprocal and mutually-compensating pressure being to cause each hook to yield inward and each link to yield outward until the links pass over the hooks and the coupling is effected by the aforesaid springs, which throw the point of the hooks outward and draw the links inward upon them, thus holding and firmly coupling the cars together automatically. The loops b are attached to said hooks in order that a chain may be fastened thereunto and wound around a rod provided with a wheel at the upper end, arranged at each end of the car in the manner in which the ordinary brake-rod is arranged, and thus the hooks may be drawn back and the cars uncoupled at any time by simply turning said rod, without going between the cars and subjecting the hand to the danger of being crushed.

Having described our improved car coupling, we will specify what we claim as new therein and desire to secure by Letters Patent:

1. The combination and arrangement of the slotted draw-head A with the hook C, provided with the link B and the spring F, as and for the purposes specified and set forth.

2. The reciprocally-arranged hooks C C and links B B, controlled and operated by a spring or springs, substantially as and for the purposes specified.

3. The adjustable link B, in combination with the hook C, as and for the purposes set forth.

4. Constructing the head of the hook of such configuration that the ordinary coupling link may be used, as herein described and shown.

M. H. CARD.
THOS. TRIPP.

Witnesses:
W. E. MARRS,
L. L. COBURN.